(12) United States Patent
Derakhshani et al.

(10) Patent No.: US 10,467,398 B1
(45) Date of Patent: Nov. 5, 2019

(54) AUTHENTICATION BY TRANSMITTING INFORMATION THROUGH A HUMAN BODY

(71) Applicant: Alibaba Group Holding Limited, George Town (KY)

(72) Inventors: Reza R. Derakhshani, Shawnee, KS (US); Spencer On, Kansas City, MO (US)

(73) Assignee: Alibaba Group Holding Limited, George Town, Grand Cayman (KY)

(*) Notice: Subject to any disclaimer, the term of this patent is extended or adjusted under 35 U.S.C. 154(b) by 0 days.

(21) Appl. No.: 16/353,876

(22) Filed: Mar. 14, 2019

(51) Int. Cl.
| | | |
|---|---|---|
| G06F 21/00 | (2013.01) | |
| G06F 21/32 | (2013.01) | |
| G06K 9/00 | (2006.01) | |
| H04L 29/06 | (2006.01) | |
| H04B 13/00 | (2006.01) | |
| G06F 11/00 | (2006.01) | |

(52) U.S. Cl.
CPC ......... *G06F 21/32* (2013.01); *G06K 9/00288* (2013.01); *H04B 13/005* (2013.01); *H04L 63/0861* (2013.01)

(58) Field of Classification Search
None
See application file for complete search history.

(56) References Cited

U.S. PATENT DOCUMENTS

| | | | | |
|---|---|---|---|---|
| 9,552,469 B2 * | 1/2017 | Jin | ..................... | G06K 9/00885 |
| 2004/0230488 A1 * | 11/2004 | Beenau | .................... | G06K 9/00 705/18 |
| 2012/0028710 A1 * | 2/2012 | Furukawa | ............... | G06F 21/32 463/37 |
| 2015/0204844 A1 * | 7/2015 | Nothacker | ......... | G01N 33/4972 73/23.3 |
| 2016/0142816 A1 * | 5/2016 | Weast | ..................... | H04R 1/46 381/151 |
| 2017/0116995 A1 * | 4/2017 | Ady | ........................ | G10L 17/24 |
| 2018/0068671 A1 * | 3/2018 | Fawaz | ................. | G10L 21/0205 |
| 2018/0145833 A1 * | 5/2018 | Lin | ..................... | G06K 9/00013 |
| 2018/0181739 A1 * | 6/2018 | Zhong | ..................... | G06F 21/62 |
| 2018/0218139 A1 * | 8/2018 | Tussy | ..................... | G06F 21/34 |
| 2018/0351994 A1 * | 12/2018 | Tian | ...................... | H04L 63/102 |
| 2018/0373924 A1 * | 12/2018 | Yoo | .......................... | G06F 21/32 |

* cited by examiner

*Primary Examiner* — Gary S Gracia
(74) *Attorney, Agent, or Firm* — Fish & Richardson P.C.

(57) ABSTRACT

The technology described in this document can be embodied in a method that includes receiving, at one or more servers from a first computing device, (i) first identification information identifying the first computing device or an application executing on the first computing device, and (ii) second identification information identifying a second computing device, wherein the second identification information is provided to the first computing device as a mechanical signal transmitted through a human body. The method also includes determining, by the server based on the first information, identity information of a user associated with the first computing device, and transmitting, from the one or more servers to the second computing device, the identity information, such that the identity information is usable by the second computing device to verify an access attempt by the user.

18 Claims, 6 Drawing Sheets

400

Capture, using one or more sensors of the kiosk device, first information about a user attempting to access the kiosk device
402

Generate, using one or more transducers of the kiosk device, a mechanical signal encoding identification information of the kiosk device
404

Receive, from one or more servers by the kiosk device, second information identifying a user of a mobile computing device that receives the mechanical signal
406

Verify, based on the first information and the second information, that the user attempting to access the kiosk device is the user of the mobile computing device
408 responsive to verifying that the user attempting to access the kiosk device is the user of the mobile device, grant the user access to the kiosk device
410

AUTHENTICATION BY TRANSMITTING INFORMATION THROUGH A HUMAN BODY

TECHNICAL FIELD

This disclosure relates to biometric authentication systems.

BACKGROUND

Systems incorporating a biometric identification technology such as face recognition or iris recognition capture information from a user and processes such information to authenticate the user using the biometric identification technology.

SUMMARY

In one aspect, this document features a computer-implemented method that includes receiving, at one or more servers from a first computing device, (i) first identification information identifying the first computing device or an application executing on the first computing device, and (ii) second identification information identifying a second computing device. The second identification information is provided to the first computing device as a mechanical signal transmitted through a human body. The method also includes determining, by the server based on the first information, identity information of a user associated with the first computing device. The method also includes transmitting, from the one or more servers to the second computing device, the identity information, such that the identity information is usable by the second computing device to verify an access attempt by the user.

Implementations of the above aspects can include one or more of the following features. The mechanical signal can include a mechanical wave sent from a moving surface, through the human body, to the first computing device. The second computing device can include a kiosk device. The first computing device can include a mobile computing device. The mobile computing device can be in mechanical communication with the human body. The mobile computing device can include a receiver that has a sensor configured to detect the mechanical signal and decoding software configured to decode the mechanical signal. The first identification information can include a phone number of the first computing device. The second identification information can include a kiosk identifier. The mechanical signal can include binary data encoded via frequency-shift keying (FSK) modulation, the binary data including the second identification information. The mechanical signal can include a frequency of up to half of a sampling rate of a sensor of the first computing device.

In another aspect, this document features a method for verifying a user at a kiosk device. The method includes capturing, using one or more sensors of the kiosk device, first information about a user attempting to access the kiosk device. The method also includes generating, using one or more transducers of the kiosk device, a mechanical signal encoding identification information of the kiosk device. The method also includes receiving, from one or more servers by the kiosk device, second information identifying a user of a mobile computing device that receives the mechanical signal. The method also includes verifying, by the kiosk device based on the first information and the second information, that the user attempting to access the kiosk device is the user of the mobile computing device, and responsive to verifying that the user attempting to access the kiosk device is the user of the mobile device, granting the user access to the kiosk device.

Implementations of the above aspects can include one or more of the following features. Generating a mechanical signal can include receiving, by the one or more transducers, an electrical signal including the kiosk identifier and converting the electrical signal into the mechanical signal. The mechanical signal can include a mechanical wave, and generating the mechanical signal can include sending the mechanical wave from a moving surface, through the human body, to the mobile computing device. Generating the mechanical signal can include the transducer moving a floor surface adjacent to the kiosk device, the floor surface being in mechanical communication with the user. The mobile computing device can be in mechanical communication with a body of the user to receive the mechanical signal. The mobile computing device can include a receiver including a sensor configured to detect the mechanical signal, and one or more processing devices configured to decode the mechanical signal. The one or more sensors of the kiosk device can include one or more image sensors, and capturing the first information about the user can include capturing an image of the user. Receiving the second information from the one or more servers can include receiving an image of the user captured during an enrollment process. The identification information of the kiosk device can include a kiosk identifier. The mechanical signal can include binary data encoded via frequency-shift keying (FSK) modulation, the binary data including the identification information of the kiosk device. The mechanical signal can include a frequency of up to half of a sampling rate of a sensor of the mobile computing device.

Various implementations described herein may provide one or more of the following advantages. By using transducers to transmit a mechanical signal through a moving surface and a human body to a mobile device, a biometric authentication process can be implemented without the active interaction of a user. Leveraging the sensors of a mobile computing device allows an identifier to be transmitted to the mobile computing device through mechanical waves or vibrations of a human body, allowing a kiosk to identify a person in a seamless way. This in turn can potentially improve the underlying biometric authentication systems and/or the usability of such systems in various applications. For example, the technologies described herein may be used to increase the reliability of biometric authentication systems and aid in spoof detection.

BRIEF DESCRIPTION OF THE DRAWINGS

FIG. 4 is a flowchart of an example process for verifying a user at a kiosk device.

Figure 1A:
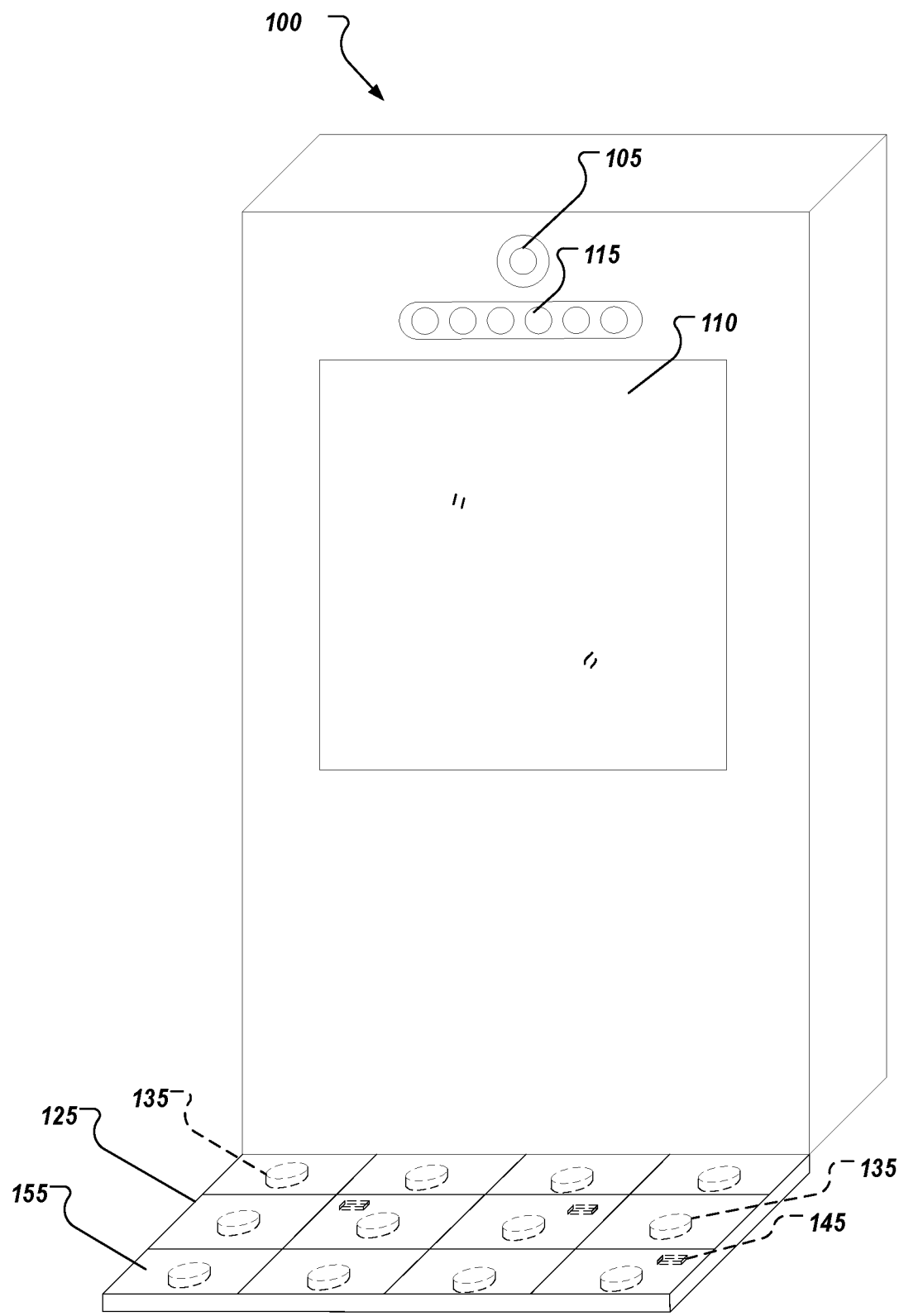
FIGS. 1A and 1B show a kiosk machine as an example environment in which the technology described herein may be used.

Repeat use of reference characters in the present specification and drawings is intended to represent same or analogous features or elements.

DETAILED DESCRIPTION

This document presents an authentication method in which a transducer of a biometric authentication system sends, through a human body, a mechanical signal to an on-body computing device of a user to facilitate identification the user by way of authenticating the device. Various biometric identification/verification systems are based on gathering or capturing information from a user. Such information may include facial images, iris images, fingerprints, retinal scans, pressure signatures, face scans, auditory biometric information (e.g., voice prints) etc., which are then compared to template information previously stored during an enrollment process. For example, a biometric authentication system that uses face identification may require enrolling users to pose for one or more images of their face during an enrollment process. The images captured during the enrollment process may be stored on a storage device accessible to the biometric authentication system. During run-time, a facial image of a user can be captured and compared with previously-stored template images of multiple users to find a matching picture and determine if the user may be authenticated. The memory or storage devices of biometric authentication systems often store very large gallery sizes, storing hundreds, thousands, tens of thousands, millions, or even more templates of different users. To authenticate a user, the biometric authentication system often compares a run-time image or template of a user with several if not all of the stored images or templates to find a matching identity. Such gallery sizes or search spaces require significant number of comparisons between probe and gallery templates leading to lower accuracy (finding the correct user out of a very large gallery can be significantly difficult or even impossible given the higher likelihood of biometric doppelgangers) and can be very slow and energy-inefficient given the required computational resources.

The technology described herein reduces the identification search space or gallery size, allowing a biometric authentication system to identify a user more quickly by way of discovering his or her on-body device. For example, when a user attempts to access a secured device (e.g., a kiosk device), the secured device transmits a mechanical signal (e.g., an encoded vibration signal) through the body of the user, wherein the mechanical signal is encoded with an identifier of the secured device. A mobile device (e.g., a smartphone or a smartwatch) in mechanical communication with the user receives the signal from the secured device, and sends, in some cases without user intervention, (i) the identifier of the secured device and (ii) a mobile device identifier (e.g., the phone number of the mobile device) to a remote back-end system implemented, for example, on a server. In response, the server sends identification information (e.g., a previously enrolled biometric template) pertaining to a user associated with the corresponding mobile device back to the secured device. The secured device can be configured to independently obtain information about the user (e.g., by capturing an image of the user using a camera on a kiosk device), compare the independently obtained information with the identification information received from the server, and verify that the user attempting to access the secured device is the same user who is associated with the mobile device. Such a verification system may significantly reduce the amount of data that the secured device has to process to authenticate users, because the search gallery size for the server is significantly reduced as a result. In the example of a kiosk device, the device can have one or more mechanical transducers positioned below the floor surface where the user stands to interact with the kiosk device. Such an arrangement may be referred to as an "active floor." The active floor can be activated using an electrical signal from a processing device of the kiosk device such that the corresponding transducers convert the electrical signal to the mechanical signal or movement (e.g., vibration) encoded with the identifier of the kiosk device. Such system may improve the user experience by increasing the speed and accuracy of authentication and also may add a security layer to additional biometric authentication methods, for example, by including a second factor (user's trusted device) in the authentication loop.

FIG. 1A shows a kiosk machine 100 as an example environment in which the technology described herein may be used. Such kiosk machines may be used for various purposes that require authenticating users via one or more biometric authentication processes. For example, the kiosk 100 can include an ATM that allows a user to withdraw money from a bank account. In another example, the kiosk 100 may be deployed at a restaurant or a fast-food outlet, and allow a user to order and pay for food. The kiosk 100 may also be deployed at an entry point (e.g., at the gate of an arena or stadium) to authenticate entrants prior to entering the venue. In general, the kiosk 100 may be deployed at various types of locations to authenticate users interactively, or even without any active participation of the user. Additionally, as described in more detail below with respect to FIG. 1B, the technology described herein may be deployed on a different environment that uses biometric authentication, such as rental bicycles or scooters, car doors, or house doors.

The kiosk 100 includes one or more components that support a biometric authentication system. For example, the kiosk 100 can include an illumination source 115 and a camera 105 that captures images of users interacting with the kiosk 100. The illumination source 115 can illuminate the user when the camera captures an image of the user to allow the camera to capture high-quality images. The captured images may be processed to identify/authenticate valid users, and/or permit or deny access to the services/products being offered through the kiosk. For example, the kiosk 100 may include a display device 110 (e.g., a capacitive touch screen) that allows a user to select and order food at a retail outlet. Once the user completes the selection via user-interfaces presented on the display device 110, the user may be asked to look towards the camera 105 for authentication. The images captured using the camera 105 may then be used to authenticate/identify a pre-stored profile for the user, and the payment for the food may then be automatically deducted from an account linked to the profile.

In some implementations, the images captured using the camera 105 can be processed using an underlying biometric authentication system to identify/authenticate the user. In some implementations, the biometric authentication system may extract from the images, various features—such as features derived from the face, iris, vasculature underlying the sclera of the eye, or the periocular region—to identify/authenticate a particular user based on matching the extracted features to that of one or more template images stored for the user during an enrollment process. The biometric authentication system may use a machine-learning process (e.g., a deep learning process implemented, for example, using a deep neural network architecture) to match the user to one of the many templates stored for various users of the system. In some implementations, the machine learning process may be implemented, at least in part, using one or more processing devices deployed on the kiosk 100. In some implementations, the kiosk 100 may communicate with one or more remote processing devices (e.g., one or more remote servers) that implement the machine learning process.

As further described in detail below with respect to FIG. 1B, the kiosk device 100 includes a surface 125 that, during run-time, is in mechanical communication with the user (e.g., through the shoes of the user) to send one or more mechanical signals to a device of the user. The surface 125 includes an active floor surface adjacent to and in front of the kiosk device 100. Below surface 125, one more tactile transducers 135 are attached to a bottom of surface 125 to move or oscillate the surface 125 at substantially the same waveform as the transducers. Transducers 135 are disposed below (e.g., underground) the surface 125 and can be attached to vibration isolators (not shown) disposed between the transducers and a floor surface to contain the vibrations within the surface 125. In some implementations the tactile transducer produces angular motion (in addition to or in lieu of linear motion). In some implementations, these linear and angular vibrations are along two or three perpendicular axes. In some implementations, active floor 125 includes tiles 155 that are each independently movable by a respective transducer 135 disposed under each tile 155. The transducer converts electrical signals to mechanical signals. In some examples, the active floor 125 includes pressure sensors 145 disposed under some or all of the floor tiles 155. Pressure sensors 145 may be activated when a user stands on a respective floor tile 155 of floor 125, and in return can send a signal to the transducer to move only the tiles 155 on which the user stands. For example, the active tiles 155 can be small (e.g., having a surface area of about one square inch) so that only the pressurized area of floor 125 that is in mechanical communication with the user's foot moves to transmit the mechanical signal to the user's body. Such feature allows the energy of the transducer to be sent only to the body of the user and not to the surrounding air, minimizing or eliminating any sound of the transduced mechanical signal. Additionally, the active tiles 155 may form a low-resolution 'image' of a foot's pressure map to determine a location of the user, weight distribution, and other relevant information useful as soft biometrics. For example, pressure sensors 145 can be used as digital scales to provide further soft biometric information to the kiosk device or a server, such as weight and center of gravity information, and even shoe size or rough sole contour. The kiosk device 100 can additionally use the information gathered by the pressure sensors 145 to adjust the camera focus and orientation with respect to the location of the user on the active floor.

Still referring to FIG. 1A, the transducers 135 may include low-frequency (LFE) transducers. Transducers 135 converts an electrical signal into a mechanical signal such as a mechanical wave. Examples of mechanical waves include surface waves, body waves, sound waves, and other waves that are initiated by an energy input such as transducer input. Referring also to FIG. 1B, the transducer transfers energy to a user's mobile device 150 through the user's body 132. For example, the transducers 135 (shown in FIG. 1A) attached to a bottom surface the floor surface 125 first moves the floor surface (e.g., causes the floor surface to vibrate), which in turn causes the human body to oscillate. The oscillations of the user's body transfer the energy of the transducers 135 to the mobile device 150. The mobile device 150 detects such oscillations and gathers the mechanical signal transmitter through the body.

Figure 1B:
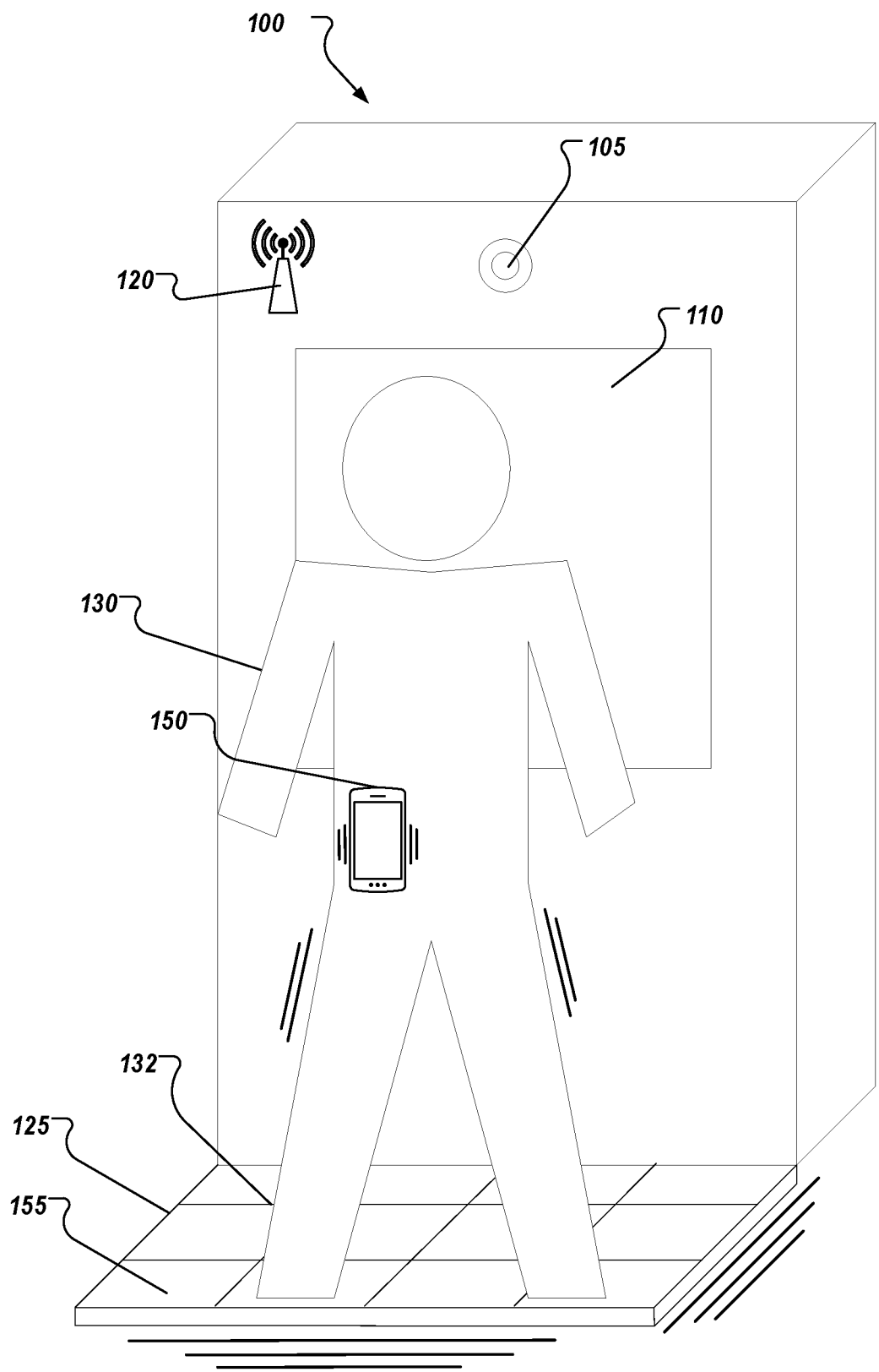

As shown in FIG. 1B, the user 130 has a mobile device 150 such as a smartphone. The mobile devices include any computing device that can be carried or worn by user 130, such as a smartphone, tablets, a Personal Digital Assistant (PDAs), a smartwatch, and so forth. The mobile device 150 may be programmed (e.g., through an installed application) to detect, decode, and send the mechanical signal transmitted through the body 132 of user 130. For example, mobile device 150 can be a smartphone that has a receiver (not shown) for receiving the mechanical signal. Such receiver can include sensors such as a gyroscope and/or an accelerometer and decoding software that, in combination with the sensors, receives the mechanical signal and decodes the signal. As further discussed in detail with respect to FIG. 2, the mobile device 150 sends a mobile device identifier and the information received from the mechanical signal to a server that then, based on the receive information, sends template information to the kiosk device 100 that is used in a biometric authentication process. Mobile device 150 is in mechanical communication with the body of the user. The term mechanical communication is used herein to describe two objects being in communication to receive or send mechanical signals. For example, mechanical communication may refer to the mobile device 150 and the user's body as being in direct contact with the body of the user (e.g., on the user's hand or pocket) possibly with intervening clothing layers, or in indirect contact with the body of the user. For example, indirect contact may include the mobile device 150 being inside a user's purse, with the purse being in 'direct contact' with the body of the user (e.g., carried on a shoulder or by hand). The mechanical signal can have a frequency that is high enough to transmit the signal from the user's body to the purse, and from the purse to the mobile device 150.

The mechanical signal can be sent through mechanical waves such as transverse waves, longitudinal waves, omnidirectional pulse waves, surface waves or a combination of waves. The mobile device 150 can receive signals embodied in multiple types of mechanical waves. To increase the effectiveness of the mobile device 150 in picking up the signal, the mobile device 150 can consider and use the most likely orientation of the sensor axis with respect to the mechanical signal that is most likely to receive a strong signal for decoding the mechanical signal. For example, an energy of target frequencies along with the expected duration of the signal can be used to judge which sensor axes to include in the decoding process. In some implementations, incoherent detection or short-term Fourier transform is used to detect the frequency-coded information or symbols. Other frequency detection algorithms, such as Goertzel, can also be implemented. In some implementations, the mechanical vibration information is encoded into the onsets of maximal correlational codes such as Barker sequences or chirps.

In some implementations, mobile device 150 has a low-frequency receiver with a sampling rate of up to 100 Hz, usually in form of multi-axes linear accelerometer of gyroscope sensor. In some implementations, to provide a different user experience (for instance to reduce the tactile feeling), aliasing can be used when decoding a higher frequency chip with a low-sampling rate receiver. For example, mechanical signals with higher-than-sampling rate frequencies (e.g., frequencies modulated using frequency-shift keying [FSK]), such as 140 Hz can be equivalent to 40 Hz at the receiver side at 100 Hz sampling. The bit rate may be increased by using multi frequency-shift keying (m-FSK) modulation where m>2, e.g., by assigning 00 to 35, 01 to 40, 10 to 45, and 11 to 50 Hz, besides shortening symbol duration. Typical symbol duration is 100-200 ms providing up to 20 bits/sec using the above-mentioned values. In some implementations, a preamble mechanical signal can be transmitted using the same or different frequency bands via active floor to indicate the start of the transmission and synchronization signaling for the ensuing data pulse train.

Referring back to FIG. 1A, the kiosk device 100 may include a processing computer (not shown) communicatively coupled with the transducer 134. The processing computer may encode the kiosk identifier in a binary code. For example, the kiosk identifier may be encoded via FSK or m-FSK modulation. The computer may then send a data stream with the binary code to the transducer 135. The transducer 135, upon receiving the binary code, converts such code into mechanical vibrations or movement that have a frequency associated with the binary code. For example, the transducer may produce a different frequency for each bit of a binary code. In some implementations, the transducer 135 and the receiver of the mobile device 150 can perform handshaking and wake-up functions to establish a communication link between the two before the mechanical signal is transmitted. The transmitter can send FSK signals to the mobile device at a frequency up to half of accelerometer and gyroscope sensors' sampling rate (typically around 100 Hz) at speeds of up to 20 bits per second. A signal at such frequencies can be almost inaudible.

In some implementations, higher frequency mechanical waves maybe be used for data transmission by taking advantage of aliasing. One advantage of such approach is reducing the tactile sensation that might be caused by platforms vibrating with lower frequencies. In some implementations, one can increase the transmission signal frequency by an integer multiple of the sampling frequency. For instance, if the accelerometer (or gyroscope) sampling frequency is 100 Hz and the original 0/1 FSK symbol frequencies were set at 35 and 45 Hz respectively, one can use new aliased transmitter frequencies of 135/145 Hz or 235/245 Hz with the same effective (aliased) readout of 35/45 Hz on the receiver side.

In some implementations, in order to improve accuracy or user experience (or both), one can use the time stamps of the transmitted signals for transmitter station identification or disambiguation. Since the transmitting stations and the receiving devices are both in communication with the service provider's servers, the server can use the time stamps of the transmitted signal(s) from broadcasting station(s) (where the user stepped on the active floor and initiated the mechanical wave transmission) to match them with those received by user device(s) with closest time stamp(s) or other temporal signatures such as pulse intervals, duration, and matching templates. In some implementations, this information is auxiliary and used for disambiguation (increasing signal entropy) in conjunction with other codes such as FSK. In some implementations, all the information is encoded temporally using indicators such as onset, duration, and intervals of transmitted signal bursts. In such cases, one may use signal compression techniques such as chirps, Barker codes, and pseudo-random sequences to create burst signals with higher signal to noise ratio and temporal resolution for temporal signature encoding, while keeping the burst duration short enough for better user experience.

Still referring to FIG. 1B, the kiosk device 100 can additionally include a transceiver 120 such as a Bluetooth beacon. The transceiver 120 may communicate wirelessly with the electronic device 150 to send a kiosk identifier or other information. Transceiver 120 may be used to 'awaken' the mobile device 150. For example, the decoding routine software (e.g., a pre-installed mobile application) may be awakened by the Bluetooth beacon or another location-based service so that the decoder of the mobile device can be triggered only when the user 130 is in front of or facing the kiosk device 100. Such feature can improve the security of the system, decrease power consumption of the mobile device and the kiosk device, and decrease false positives. Additionally, the Bluetooth beacon or similar device can increase the reliability of the biometric authentication system described herein. For example, even if the mobile device 150 doesn't correctly decode or partially decodes the mechanical signal, the server or kiosk device 100 can combine the mobile device identification information with the biometric capabilities of the Bluetooth beacon (or similar) to identify the user 130.

Though the present example depicts a kiosk device with a movable floor surface, the system implemented herein can be used in other environments such as in a house door, a car door, a rental bicycle or scooter, and other related environments. For example, the movable surface 125 is shown as a floor surface in front of the kiosk device, but the movable surface can instead be a handle, a seat, a keyboard, or other surface used or touched by the user to access a system. For example, a door handle can be moved by a transducer that sends a mechanical signal through the body of the user as the user touches the handle. In some instances, the system described herein can be used to exchange private keys from phone to shared bikes or vehicles, computer touchpads, doors, smart homes, and to and from other people.

Figure 2:
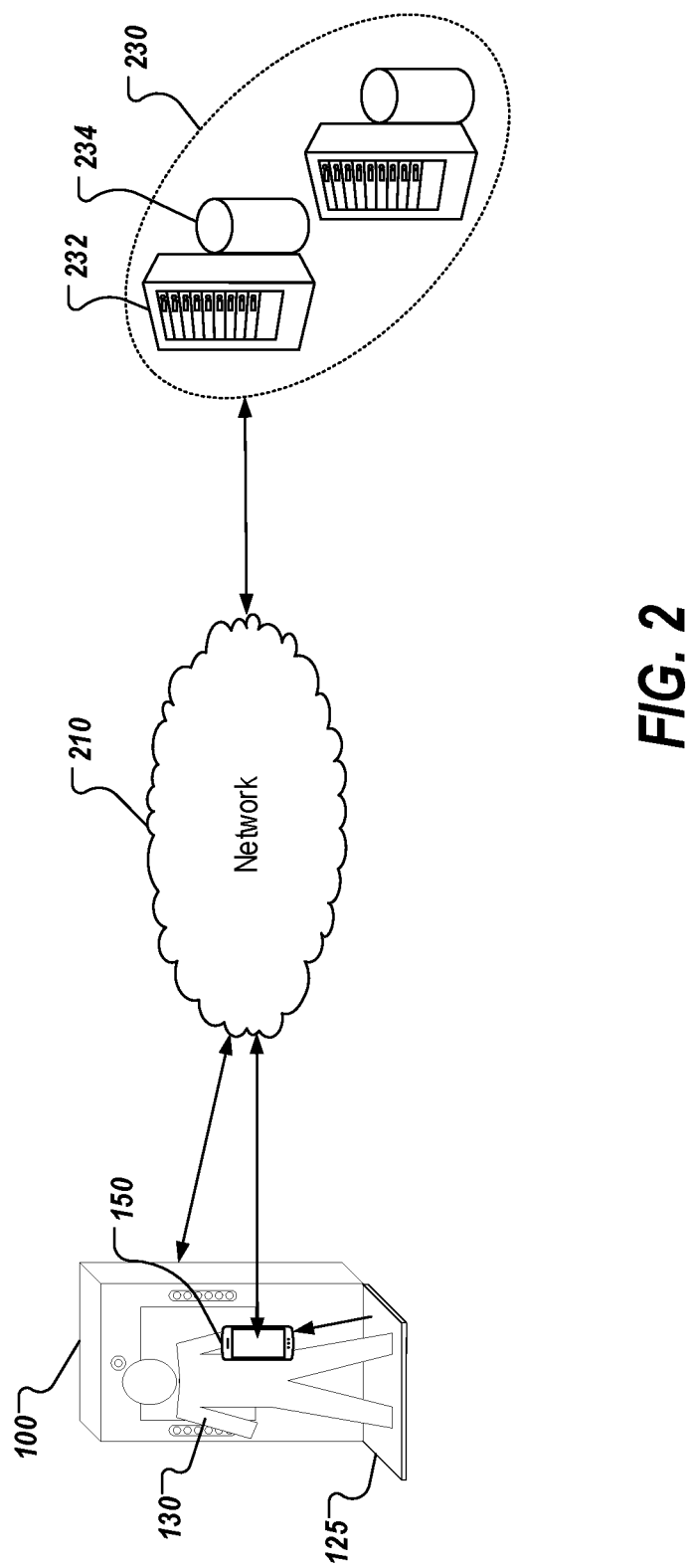
FIG. 2 depicts an example architecture in accordance with implementations of the present disclosure.

Referring to FIG. 2, a biometric authentication system leverages a mobile computing device 150, the physical body of a user 130, sensors, and communication channels such as data networks to reduce the computing search space, and quickly authenticating a user. For example, a user 130 standing in front of the kiosk 100 may be authenticated without the need of active participation by the user. In this example, a back-end system such as a server system 230 includes one or more processing devices 232 and memories 234 that store information associated with user 130, such as facial images captured during an enrollment process. The mobile device 150 may be programmed (e.g., through an installed application) to detect, decode, and send the mechanical signal transmitted through the body of user 130. The information encoded in the mechanical signal may include a kiosk identifier. Upon receiving and decoding the mechanical signal, mobile device 150 sends, through a network 210, the kiosk identifier and a mobile device identifier (e.g., a phone number associated with the mobile device or an application identifier) to server 230. The memory 234 or storage device of server 230 contains an image gallery of users previously enrolled. Using the mobile device identifier, the server finds the template image or images associated with the mobile device identifier and sends that image, through the network 210, to the kiosk device 100 associated with the kiosk identifier. Upon receiving the template image from the server 230, the kiosk device 100 compares an image of the user taken during run-time with the template image to perform one-to-one authentication, instead of 1:N authentication.

In some implementations, the active floor is used to partially reduce the search radius for the receiver identification and not necessarily to establish a one to one match. In such cases, a second factor—most likely a biometric identifier such as a face recognition system—can be used to ascertain the identity of the user from the smaller pool. In some cases, the identification of a subset of devices (rather than locating a particular device) can be used to improve the user experience, for example, by shortening the transmitted signal at the expense of its specificity and entropy. In some implementations, this can also be part of a fallback approach when part of the transmitted signal cannot be resolved due to noise or other errors.

Figure 3:
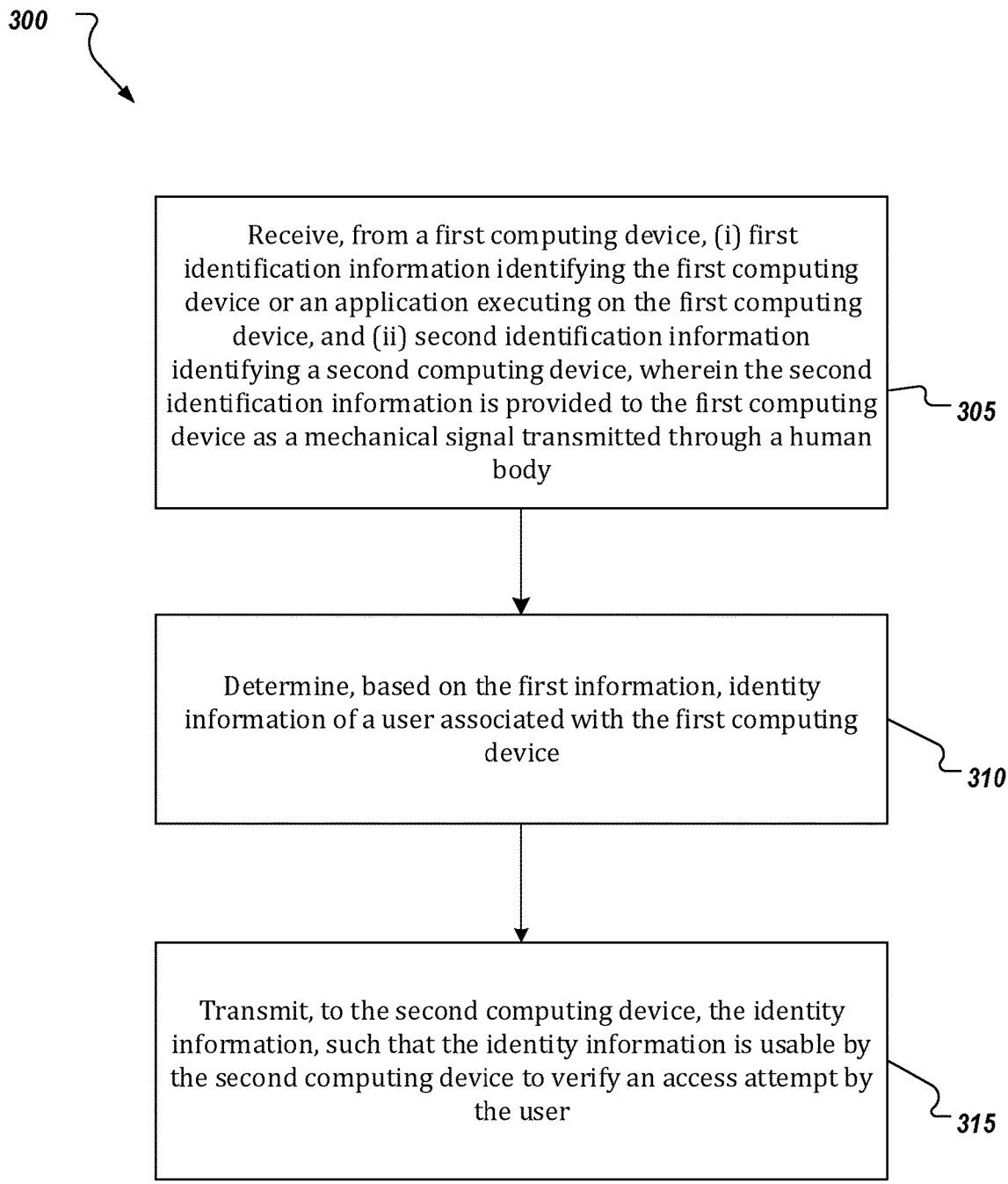
FIG. 3 is a flowchart of an example process for verifying an access attempt by a user.

FIG. 3 is a flowchart of an example process for authenticating a user. In some implementations, at least a portion of the process 300 may be executed by one or more processing devices disposed within one or more servers such as the server 230 described with reference to FIG. 2. Operations of the process 300 includes receiving, at one or more servers from a first computing device, (i) first identification information identifying the first computing device or an application executing on the first computing device, and (ii) second identification information identifying a second computing device, wherein the second identification information is provided to the first computing device as a mechanical signal transmitted through a human body (305). The second computing device may include a kiosk device and the first computing device may include a mobile computing device. The second identification information may include a kiosk identifier and the first identification information may include a phone number or application identifier of the mobile computing device. The mobile computing device may be in physical contact with the body of the user (or indirectly by way of a piece of clothing mechanically coupled with the body such as pants pockets) to detect the floor-transmitted mechanical signal. In some examples, the mobile computing device is not in direct contact with the user. For example, the mobile device can be inside a purse or bag that is held by the user, and the mechanical signal may have a frequency sufficiently high to travel through the user's body and the purse or bag to the mobile device. The mobile computing device has a receiver that may include a sensor configured to detect the mechanical signal and may additionally include decoding software configured to decode the mechanical signal.

Operations of the process 300 further includes determining, by the server based on the first information, identity information of a user associated with the first computing device (310), and transmitting, from the one or more servers to the second computing device, the identity information, such that the identity information is usable by the second computing device to verify an access attempt by the user (315).

FIG. 4 is a flowchart of an example process for authenticating or verifying a user at a kiosk device. In some implementations, at least a portion of the process 400 may be executed by one or more kiosk devices such as the kiosk device 100 described with reference to FIGS. 1A and 1B. Operations of the process 400 include capturing, using one or more sensors of the kiosk device, first information about a user attempting to access the kiosk device (402). The one or more sensors may include an image sensor of a camera, and capturing the first information about the user may include capturing an image of the user standing in front of the kiosk device. The process 400 further includes generating, using one or more transducers of the kiosk device, a mechanical signal encoding identification information of the kiosk device (404). Generating a mechanical signal may include receiving, by the one or more transducers, an electrical signal including the kiosk identifier and converting the electrical signal into the mechanical signal. The transducer may be configured to move a floor surface in front of the kiosk device where the user stands. The mechanical signal includes a mechanical wave, and generating the mechanical signal includes sending the mechanical wave from a moving surface, through the human body, to the first computing device. The process 400 may in addition contain a proximity sensing mechanism, such as floor-embedded pressure sensors or other proximity sensors such as capacitive, infrared, or time of flight proximity sensors to initial the mechanical wave transmission only when the user is properly standing on the active floor.

Operations of the process 400 further includes receiving, from one or more servers by the kiosk device, second information identifying a user of a mobile device that receives the mechanical signal (406). The second information from the one or more servers includes may include an image or biometric template of the user captured and stored during an enrollment process. The process 400 includes verifying, by the kiosk device based on the first information and the second information, that the user attempting to access the kiosk device is the user of the mobile device (408), and responsive to verifying that the user attempting to access the kiosk device is the user of the mobile device, granting the user access to the kiosk device (410).

Figure 5:
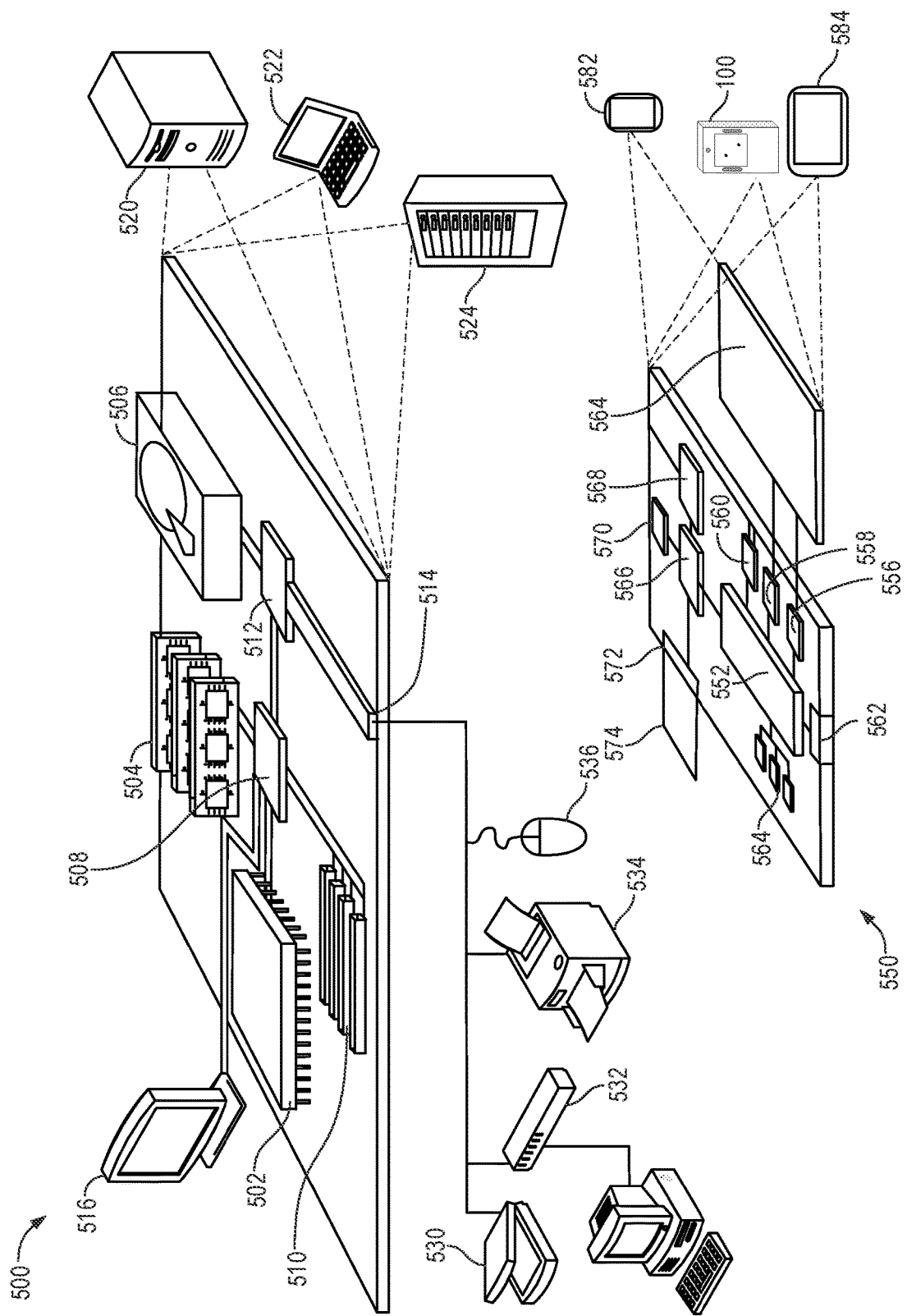
FIG. 5 is a block diagram representing examples of computing devices.

FIG. 5 shows an example of a computing device 500 and a mobile device 550, which may be used with the techniques described here. For example, referring to FIG. 1, the kiosk device 100 can include one or more of the computing device 500 or the mobile device 550, either in part or in its entirety. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is an example only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, and so forth) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back-end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back-end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A computer-implemented method comprising:
   receiving, at one or more server devices over a communication network, from a first computing device, (i) first identification information identifying the first computing device or an application executing on the first computing device, and (ii) second identification information identifying a second computing device, wherein the second identification information is provided to the first computing device as a mechanical signal encoded with the second identification information, and transmitted through a human body as vibration waves, wherein the first computing device is a mobile computing device in physical contact with the human body or mechanically coupled with the human body to detect the vibration waves;
   determining, by the one or more server devices based on the first identification information, identity information of a user associated with the first computing device, wherein the one or more server devices locates one or more biometric template images associated with the first identification information; and
   transmitting, from the one or more server devices to the second computing device, the biometric template image, such that biometric template image is usable to compare an image captured by the second computing device to verify an access attempt by the user of a resource associated with the second computing device.

2. The computer-implemented method of claim 1, wherein the vibration waves are sent from a moving surface, through the human body, to the first computing device.

3. The computer-implemented method of claim 1, wherein the second computing device comprises a kiosk device.

4. The computer-implemented method of claim 1, wherein the mobile computing device comprises a receiver comprising a sensor configured to detect the mechanical signal and decoding software configured to decode the mechanical signal.

5. The computer-implemented method of claim 1, wherein the first identification information comprises a phone number of the first computing device.

6. The computer-implemented method of claim 1, wherein the second identification information comprises a kiosk identifier.

7. The computer-implemented method of claim 1, wherein the mechanical signal comprises binary data encoded via frequency-shift keying (FSK) modulation, the binary data comprising the second identification information.

8. The computer-implemented method of claim 1, wherein the mechanical signal comprises a frequency of up to half of a sampling rate of a sensor of the first computing device.

9. A method for verifying an access attempt at a kiosk device, the method comprising:
   capturing, using one or more sensors of the kiosk device, a first image of a first user attempting to access the kiosk device;
   generating, using one or more transducers of the kiosk device, a mechanical signal encoding identification information of the kiosk device, the mechanical signal being transmitted through a body of the first user as vibration waves;
   receiving, from one or more server devices by the kiosk device, one or more biometric template images of a user associated with a mobile computing device that receives the mechanical signal;
   verifying, by the kiosk device based on the first image information and the one or more biometric template images, that the first user is the user of associated with the mobile computing device; and
   responsive to verifying that the first user is the user of associated with the mobile computing device, granting the first user access to the kiosk device.

10. The method of claim 9, wherein generating a mechanical signal comprises receiving, by the one or more transducers, an electrical signal comprising the identification information of the kiosk device, and converting the electrical signal into the mechanical signal.

11. The method of claim 9, wherein the vibration waves are sent from a moving surface, through the body of the first user, to the mobile computing device.

12. The method of claim 11, wherein the moving surface comprises a floor surface adjacent to the kiosk device, and generating the mechanical signal comprises the one or more transducers moving the floor surface, the floor surface being in mechanical communication with the first user.

13. The method of claim 9, wherein the mobile computing device is in mechanical communication with the body of the first user to receive the mechanical signal.

14. The method of claim 9, wherein the mobile computing device comprises a receiver comprising a sensor configured to detect the mechanical signal, and one or more processing devices configured to decode the mechanical signal.

15. The method of claim 9, wherein the one or more sensors of the kiosk device comprises one or more image sensors.

16. The method of claim 9, wherein receiving the one or more biometric template images are captured during an enrollment process.

17. The method of claim 9, wherein identification information of the kiosk device comprises a kiosk identifier.

18. The method of claim 9, wherein the mechanical signal comprises binary data encoded via frequency-shift keying (FSK) modulation, the binary data comprising the identification information of the kiosk device.

\* \* \* \* \*